(12) United States Patent
Lindner et al.

(10) Patent No.: US 9,353,855 B2
(45) Date of Patent: May 31, 2016

(54) METHOD FOR PROCESSING AN ACTUATION OF AN OPERATING ELEMENT IN A MOTOR VEHICLE

(71) Applicant: Bayerische Motoren Werke Aktiengesellschaft, Munich (DE)

(72) Inventors: Matthias Lindner, Graefelfing (DE); Thomas Tille, Munich (DE); Viktor Rack, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 13 days.

(21) Appl. No.: 14/316,350

(22) Filed: Jun. 26, 2014

(65) Prior Publication Data

US 2014/0309896 A1    Oct. 16, 2014

Related U.S. Application Data

(63) Continuation of application No. PCT/EP2012/073022, filed on Nov. 20, 2012.

(30) Foreign Application Priority Data

Dec. 27, 2011    (DE) .................. 10 2011 089 980

(51) Int. Cl.
*F16H 61/02* (2006.01)
*F16H 61/18* (2006.01)
(Continued)

(52) U.S. Cl.
CPC ............ *F16H 61/0213* (2013.01); *B60K 37/06* (2013.01); *F16H 59/044* (2013.01); *F16H 59/105* (2013.01); *F16H 61/18* (2013.01); *B60K 2350/1036* (2013.01); *F16H 2059/0221* (2013.01)

(58) Field of Classification Search
None
See application file for complete search history.

(56) References Cited

U.S. PATENT DOCUMENTS 7,784,481 B2    8/2010    Kunkel
8,028,599 B2   10/2011    Mack
(Continued)

FOREIGN PATENT DOCUMENTS

DE            100 03 140 C1   8/2001
DE    10 2004 039 917 A1      2/2006
(Continued)

OTHER PUBLICATIONS

International Search Report dated Jan. 21, 2013 with English translation (five (5) pages).
(Continued)

*Primary Examiner* — Edwin A Young
(74) *Attorney, Agent, or Firm* — Crowell & Moring LLP

(57) ABSTRACT

A method is provided for processing an actuation of an operating element in a motor vehicle, particularly of an operating lever, wherein the operating element can be actuated at least by the driver of the motor vehicle. A plurality of sensors are arranged on the operating element, which sensors are at least partially activated when the operating element is actuated. The time sequence of the activation of the sensors is detected when the operating element is actuated, and, based on the time sequence, it is determined whether an undesired actuation is occurring, undesired actuations including unintended actuations and/or actuations by a front-seat passenger. In the event of an undesired actuation, the implementation of one or more actions coupled to the actuation of the operating element in the vehicle is blocked.

20 Claims, 3 Drawing Sheets

(51) Int. Cl.
  *F16H 59/10* (2006.01)
  *F16H 59/04* (2006.01)
  *B60K 37/06* (2006.01)
  *F16H 59/02* (2006.01)

(56) References Cited

U.S. PATENT DOCUMENTS

| 8,196,491 | B2 | 6/2012 | Wilson et al. | |
|---|---|---|---|---|
| 2006/0236800 | A1* | 10/2006 | Yone | F16H 59/044 74/336 R |
| 2009/0038426 | A1* | 2/2009 | Buttolo | F16H 61/24 74/473.3 |
| 2010/0100290 | A1* | 4/2010 | Sauter | B60W 10/02 701/52 |
| 2012/0010485 | A1 | 1/2012 | Couronne et al. | |

FOREIGN PATENT DOCUMENTS

| DE | 10 2007 018 246 A1 | 10/2008 |
|---|---|---|
| DE | 10 2008 056 250 A1 | 4/2010 |
| WO | WO 2007/121977 A2 | 11/2007 |

OTHER PUBLICATIONS

German Search Report dated Sep. 25, 2012, including English translation (ten (10) pages).

* cited by examiner

METHOD FOR PROCESSING AN ACTUATION OF AN OPERATING ELEMENT IN A MOTOR VEHICLE

CROSS REFERENCE TO RELATED APPLICATIONS

This application is a continuation of PCT International Application No. PCT/EP2012/073022, filed Nov. 20, 2012, which claims priority under 35 U.S.C. §119 from German Patent Application No. 10 2011 089 980.4, filed Dec. 27, 2011, the entire disclosures of which are herein expressly incorporated by reference.

BACKGROUND AND SUMMARY OF THE INVENTION

The invention relates to a method for processing an actuation of an operating element in a motor vehicle as well as to a corresponding operating element and a corresponding motor vehicle.

When actuating an operating element in a motor vehicle, it is often desirable in the case of safety-critical operating functions to appropriately detect an unintended or misapplied actuation of the operating element such as may occur, for example, by a child in the front passenger seat, and to, in such a case, not trigger the action linked to the actuation of the operating element.

It is known from the state of the art to determine an operation of an operating element by a front-seat passenger by way of a high-expenditure front-seat passenger recognition. The front-seat passenger recognition is based on optical sensors with an image processing on the output side, which acquire an image of the area of the front-seat passenger position and recognize whether a front-seat passenger is situated in the front-seat passenger position and is carrying out an operation.

It is further known from the state of the art to avoid an unintended actuation of a gear selector lever in a motor vehicle in that an additional button is provided on a driver-side flank of the gear selector lever, which button has to be pressed when changing into specific drive positions. If this is not the case, no engaging of the gear or no gear change will take place. Such an additional button results in restrictions of comfort when actuating the gear selector lever. Furthermore, it can also not be excluded that a front-seat passenger will press the button and trigger a corresponding actuation of the gear selector lever.

It is therefore an object of the invention to easily and reliably determine within the scope of the actuation of an operating element in a motor vehicle whether an intended actuation of the operating element is taking place.

This and other objects are achieved by a method, and corresponding operating element, for processing an actuation of the operating element in a motor vehicle, particularly of an operating lever, wherein the operating element can be actuated at least by the driver of the motor vehicle. A plurality of sensors are arranged on the operating element, which sensors are at least partially activated when the operating element is actuated. The time sequence of the activation of the sensors is detected when the operating element is actuated, and, based on the time sequence, it is determined whether an undesired actuation is occurring, undesired actuations comprising unintended actuations and/or actuations by a front-seat passenger. In the event of an undesired actuation, the implementation of one or more actions coupled to the actuation of the operating element in the vehicle is blocked.

The method according to the invention is used for processing an actuation of an operating element in a motor vehicle, particularly in a passenger car and, if appropriate, also in a truck. The operating element, which may, for example, be constructed as an operating lever, can be actuated at least by the driver of the motor vehicle. A plurality of sensors is arranged on the operating element, which are at least partially activated when the operating element is actuated. An activation of a sensor will then be present when the sensor senses a corresponding signal whose strength, as a rule, has to exceed a predefined threshold. As required, the activation may also be coupled to the condition that the sensed signal has been present for at least a predefined time in order to not consider hereby detected signals which are not caused by an actuation of the operating element.

Within the scope of a method according to the invention, the time sequence of the activation of the sensors is detected, as required, when the operating element is actuated, and, based on the time sequence, it is determined whether there is an undesired actuation, undesired actuations comprising unintended actuations and/or actuations by a front-seat passenger. If an undesired actuation is occurring, the implementation of one or more actions coupled to the actuation of the operating element in the vehicle will be blocked. The term of the time sequence of the activation of the sensors also implies the number of sensors activated in the time sequence. As required, this number may be taken into account when it is determined whether an undesired actuation is occurring.

The method according to the invention is based on the recognition that, in the case of an appropriate positioning of sensors on the operating element, the activation pattern of the sensors resulting from the actuation of the operating element provides information as to whether an intended actuation or a not intended actuation is involved in the form of an unintended actuation or an actuation by a front-seat passenger. In a simple manner, a safety-critical actuation of an operating element can thereby be detected by sensors mounted on the operation element, without requiring a high-expenditure visual detection system for this purpose. Likewise, if appropriate, an additional button may not be necessary which, within the scope of the actuation of the operating element, has to be pressed by the user and limits the operating comfort. In this case, the actuation of the operating element preferably takes place by means of the user's hand which touches the operating element during the actuation.

In a particularly preferred embodiment, the sensors comprise one or more proximity sensor(s), and particularly one or more cost-effective capacitive sensors. Preferably, all sensors of the plurality of sensors are proximity sensors. By way of such sensors, a corresponding approaching or contact of the operating element can be detected in a simple manner, the sequence of the contact providing information as to whether the corresponding actuation is a desired actuation.

According to the method of the invention, the number of sensors provided on the operating element may vary. In a preferred embodiment, at least four sensors are arranged on the operating element, so that a reliable differentiation between desired and undesired actuations is achieved.

Various further developments are contemplated, according to which corresponding activation sequences of the sensors are coupled to undesired actuations of the operating element. In a simple embodiment of the invention, an actuation, in which the number of activated sensors is less than a minimum number, represents an undesired actuation, from which, as a rule, an unintended actuation can be inferred.

In a particularly preferred embodiment of the invention, the method is used for an operating lever, which is arranged between a driver position and a front-seat passenger position, and, in particular, represents a gear selector lever to whose actuation the change of a gear or a driving mode is coupled. The term "gear selector lever" is understood to be broad and, in particular, also comprises the selector lever for automatic transmissions.

When the method according to the invention is used for the just described operating lever between the driver position and the front-seat passenger position, the plurality of sensors comprises the following sensors in a particularly preferred embodiment:

one or more first sensors on a driver-side flank of the operating lever;
one or more second sensors on a front-passenger-side flank of the operating lever;
one or more third sensors on a center flank of the operating lever, which extends between the driver-side flank and the front-passenger-side flank, the center flank preferably representing a backside of the operating lever hidden from the driver position.

Such a sensor arrangement can very easily detect movements of the user's hand, when reaching around the operating lever or the gear selector lever, by way of the activation sequence of the sensors. In particular, a time sequence of the activation of the sensors, according to which, firstly, at least one second sensor, subsequently, at least one first sensor and, finally, at least one third sensor is activated, represents an undesired actuation which, as a rule, allows the conclusion that the operating lever is not touched by the driver but by the front-seat passenger within the scope of the reach-around movement.

In a further embodiment, a time sequence of the activation of the sensors, according to which no third sensor is activated or according to which only at least one first sensor or at least one second sensor or at least one third sensor is activated, represents an undesired actuation. As a rule, these actuations allow the conclusion that no intended reach-around movement of the operating lever is carried out, but rather a misapplied or unintended actuation of the operating lever is occurring.

When determining whether an undesired actuation is occurring, in a further embodiment of the invention, the detected time sequence of the activation of sensors is compared with a plurality of stored time sequences of the activation of sensors, the stored time sequences being classified in undesired and permitted actuations. Based on this comparison, the detected time sequence is then classified as an undesired actuation or a permitted actuation. In the case of a permitted actuation, the action or actions linked to the actuation will then be carried out and not blocked. By means of such a variant of the invention, a particularly fine classification of the actuations then becomes possible by using a large number of previously stored activation sequences, and thereby a particularly reliable recognition of undesired actuations will be achieved.

In a further embodiment of the method according to the invention, an end of a time sequence of the activation of the sensors will be determined when the activation of a sensor activated within the scope of the actuation has ended. Furthermore, it can be inferred that the corresponding operating element has been released by the user and the actuation operation has therefore been concluded.

In addition to the above-described method, the invention further relates to an operating element for a motor vehicle, particularly an operating lever, in which case the operating element can be actuated at least by the driver of the motor vehicle, and a plurality of sensors are arranged on the operating element, which sensors are at least partially activated during the actuation of the operating element. The operating element includes a device for processing an actuation of the operating element, such as a programmed processor, which is further developed such that the time sequence of the activation of the sensors is detected during the actuation of the operating element, and, based on the time sequence, it is determined whether an undesired actuation is occurring, undesired actuations comprising unintended actuations and/or actuations by a front-seat passenger. In the case of such an undesired actuation, the implementation of one or more actions coupled to the actuation of the operating element in the motor vehicle is blocked.

The operating element is preferably further developed such that one or more of the preferred embodiments of the method according to the invention can be implemented by way of the operating element.

The invention further relates to a motor vehicle which includes the above-described operating element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
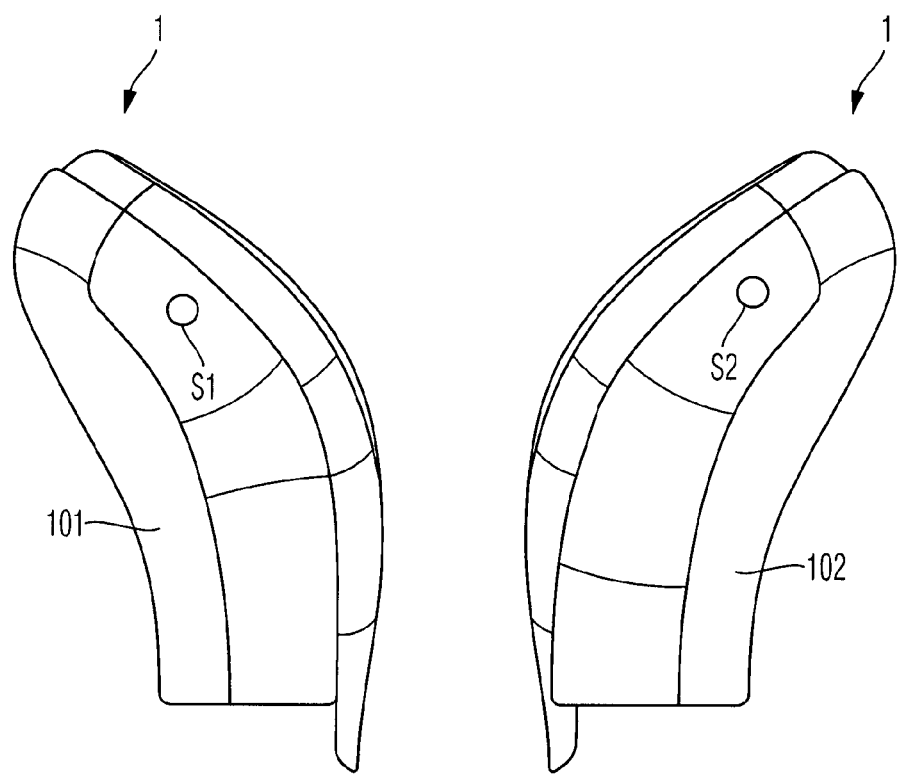
FIG. 1 represents lateral views of an embodiment of an operating lever according to the invention.

In the following, the invention will be described based on an operating element in the form of an automatic gear selector lever in the center console of a motor vehicle. FIG. 1 shows the lateral views of such a gear selection lever 1 which is integrated in a left-hand drive vehicle. In this case, the left lateral view shows the driver-side flank 101 of the gear selection lever, and the right view shows the front-passenger-side flank 102 of the gear selecting lever. It is illustrated that, in the driver-side flank 101, a sensor S1 is provided, which is arranged in the upper area of the flank, and, in the front-seat passenger-side flank 102, a sensor S2 is provided which is arranged in the upper area of the flank. In the embodiment of FIG. 1, these sensors are proximity sensors in the form of capacitive sensors, by which, in a suitable manner, the contact of the gear selector lever can be detected at the location of the sensors. Accordingly, a sensor is activated in the case of contact of the gear selector lever at the sensor position, in which case, the activation, as required, will take place only when a corresponding sensor signal is detected over a predefined time period. In this manner, only very brief contacts, which are not in connection with the actuation of the gear selector lever, will not be taken into account during the analysis of the sensor signals.

Figure 2:
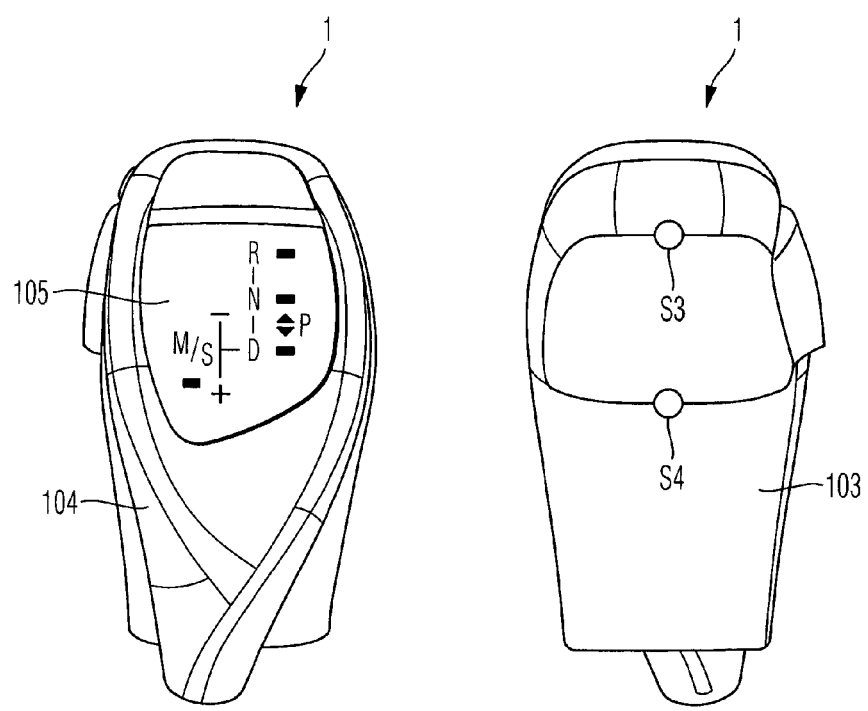
FIG. 2 represents a front and rear view of the operating lever of FIG. 1.

FIG. 2 is the front view and the rear view of the gear selector lever of FIG. 1. In the left part of FIG. 2, the front side 104 of the gear selector lever 1 is illustrated, in which a display area 105 is provided, in which, in a manner known per se, the selectable gears or driving modes are indicated to the driver by way of suitable letters. "R" indicates the reverse gear; "N" indicates the neutral position; "D" indicates the forward gear; "M/S" indicates the sporty mode; and "P"

stands for parking Depending on the selected gear or driving mode, a corresponding bar will light up next to the letter. In the right-hand part of FIG. 2, it is shown that, on the back-side 103 of the gear selector lever, in turn, two capacitive sensors S3 and S4 are mounted, which are positioned along the longitudinal axis of the gear selector lever, the sensor S3 being provided in the upper area of the gear selector lever, and the sensor S4 being provided in the center area of the gear selector lever.

Based on the four sensors S1 to S4 of the just described gear selector lever 1, in the described embodiment, actuations of the gear selector lever intended by the driver can now be differentiated from unintended actuations or actuations of the front-seat passenger. In order to achieve this, in the event of the actuation of the gear selector lever, i.e. always when the gear selector lever is triggered by pushing or pulling, the correspondingly linked time sequence of the activation of the sensors S1 and S4 is detected. It is then derived from the above in a suitable manner whether the actuation was not intended by the driver or was carried out by the front-seat passenger. If this is so, the action, i.e. the shifting of the corresponding gear, linked to the actuation of the gear selector lever will not be carried out. In this case, the analysis of the activation sequence, as required, may be taken into account only when certain gears are engaged. In particular, the analysis may only take place when a shifting from the parking position P or from the neutral position N takes place into the drive position D or the reverse gear R, because this shifting may cause the vehicle to start driving and is therefore safety-critical.

Figure 3:
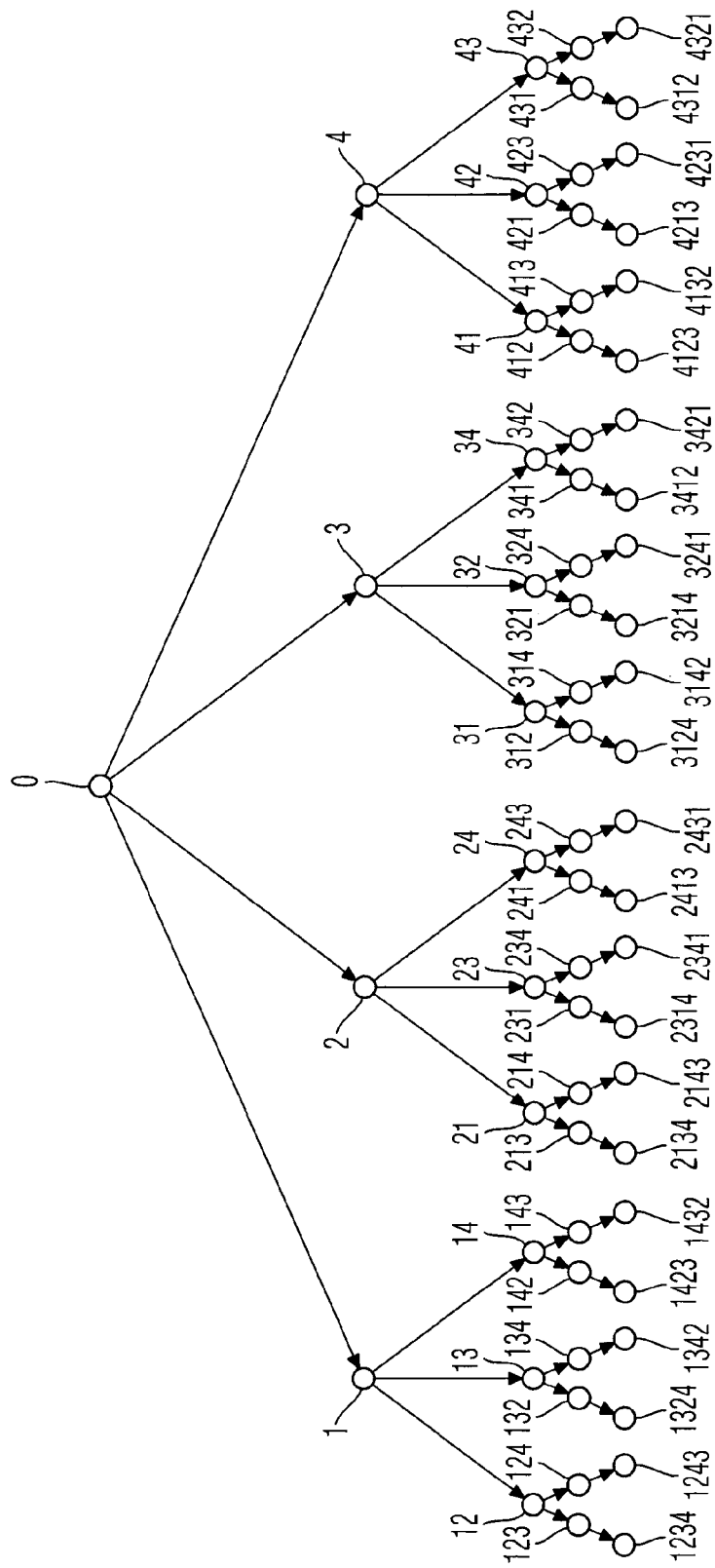
FIG. 3 is a constructional diagram, which illustrates all detectable activation sequences of the sensors installed in the operating element of FIGS. 1 and 2, respectively.

The use of the four sensors S1 to S4 may result in a total of 64 time sequences of the activation of the sensors. In the following, these time sequences are also called activation patterns. The activation patterns differ with respect to the sequence or the number of the activated sensors, i.e. the activation patterns may include one, two, three or four activated sensors in a differing sequence. The 64 detectable activation patterns for the four sensors of the gear selector lever 1 are illustrated in FIG. 3. The actuation patterns are detectable by a suitably programmed processor or the like. The numbers used in FIG. 3 there are not reference symbols in the traditional sense, but rather represent the time sequence in which the individual sensors S1 to S4 are activated. The number "1" indicates the activation of the sensor S1; the number "2" indicates the activation of the sensor S2; the number "3" indicates the activation of the sensor S3, and the number "4" indicates the activation of the sensor S4.

Thus, for example, the activation pattern "2341" corresponds to a scenario in which first the sensor S2, then the sensor S3, subsequently the sensor S4 and finally the sensor S1 is activated. The end of an activation sequence can, for example, be determined by the fact that the activation of an already activated sensor is terminated, which, as a rule, corresponds to the start of the release of the gear selector lever. For the purpose of a clarification, the root node in the tree diagram of FIG. 3 has the reference number 0, which corresponds to the condition in which none of the sensors is activated.

As a result of a suitable classification of the possible activation patterns and their comparison with actually detected patterns, unintended operations can thereby be detected in a suitable manner. In a variant, an unintended operation will be determined when only one of the sensors S1 to S4 is activated, which corresponds to the conditions 1, 2, 3 and 4 in the tree diagram of FIG. 3. When only one sensor is actuated, it can, as a rule, be assumed that the gear selector lever was brushed only accidentally and was thereby actuated. Likewise, undesired actuations can be determined when, neither sensor S3 or S4 is activated within the activation sequence, because it can be assumed in this case that no contact in the form of a reaching-around the gear selector lever for engaging a gear is involved. An undesired actuation may particularly also be determined when the activation pattern is further developed such that, at first, only the sensor S2 and only subsequently the sensor S1 is activated, because this activation sequence allows the conclusion that a reach-around movement for shifting the gear selector lever is not carried out as intended by the driver but by the front-seat passenger. Specifically, a reach-around movement by the driver would first result in the activation of the sensor S1 and only subsequently in the activation of the sensor S2.

The above explained cases concerning activation sequences of undesired actuations are only examples and, depending on the application case, may also have different forms. For example, a different number or arrangement of sensors may also be provided at the gear selector lever. The system can further be refined such that a very large number of activation patterns of a plurality of sensors can be stored in a corresponding memory and be appropriately categorized, whereby the recognition accuracy for undesired actuations is improved.

The embodiments of the invention described above have a number of advantages. In particular, the safety risk or the accident risk as a result of careless operations of safety-relevant operating elements, such as the above-described gear selector lever, can be reduced. Careless operations include those operations which were unintentionally carried out or carried out by the front-seat passenger and were noticed too late by the driver. Particularly the unlocking button for the driver, which is currently provided at the gear selector lever, will no longer be necessary because, as a result of the detection of the time sequence of the activation of the sensors, it can be recognized whether the drive position is intentionally engaged by the driver. This increases the driver's comfort when the gear selector lever is used. The invention can further be implemented in a cost-effective manner by using economical capacitive sensors. In particular, no high-expenditure visual front-seat passenger monitoring will be required in order to detect actuations of the gear selector lever or of another operating element carried out by the front-seat passenger.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing an actuation of an operating element in a motor vehicle, the operating element being actuatable at least by a driver of the motor vehicle, wherein a plurality of sensors are arranged on the operating element, said plurality of sensors being at least partially activatable when the operating element is actuated, the method comprising the acts of:

detecting a time sequence of activation of the plurality of sensors when the operating element is actuated;

based on the detected time sequence, determining whether an undesired actuation is occurring, wherein the undesired actuation comprises unintended actuations and/or actuations by a front-seat passenger; and when it is determined that an undesired actuation is occurring, blocking an implementation of one or more actions coupled to the actuation of the operating element in the vehicle.

2. The method according to claim 1, wherein the operating element is an operating lever of the motor vehicle.

3. The method according to claim 1, wherein the plurality of sensors comprise one or more proximity sensors.

4. The method according to claim 3, wherein the proximity sensors comprise capacitive sensors.

5. The method according to claim 1, wherein the plurality of sensors comprise at least four sensors arranged on the operating element.

6. The method according to claim 1, wherein it is determined that an undesired actuation is occurring when a number of activated sensors is lower than a minimum number.

7. The method according to claim 1, wherein the operating element is a gear selector lever arranged between a driver position and a front-seat passenger position of the motor vehicle, the action associated with the actuation of the gear selector lever comprising a change of gear or a change of driver mode.

8. The method according to claim 7, wherein:
one or more first sensors are arranged on a driver-side flank of the gear selector lever;
one or more second sensors are arranged on a front-passenger-side flank of the gear selector lever; and
one or more third sensors are arranged on a center flank of the gear selector lever, the center flank extending between the driver-side flank and the front-passenger-side flank.

9. The method according to claim 8, wherein the center flank corresponds to a back side of the gear selector lever, which back side faces a longitudinal forward driving direction of the vehicle.

10. The method according to claim 9, wherein an undesired actuation is determined when the detected time sequence corresponds to, first, at least one second sensor being activated, subsequently, at least one first sensor being activated, and, finally, at least one third sensor being activated.

11. The method according to claim 9, wherein an undesired actuation is determined when the detected time sequence detects no activation of a third sensor, or only an activation of at least one first sensor, at least one second sensor, or at least one third sensor.

12. The method according to claim 1, further comprising the acts of:
when determining whether an undesired actuation is occurring, comparing the detected time sequence of the activation of the sensors with one or more stored time sequences of the activation of the sensors, wherein the one or more stored time sequences are classified as undesired or permitted actuations;
based on the comparison, classifying the detected time sequence as an undesired or permitted actuation.

13. The method according to claim 1, wherein activation of a sensor occurs only when the sensor senses a signal over a predefined time period.

14. The method according to claim 1, further comprising the act of:
determining an end of the time sequence of the activation of the sensors when the activation of a sensor has been terminated.

15. An operating element for a motor vehicle, the operating element being actuated at least by a driver of the motor vehicle, the operating element comprising:
a plurality of sensors arranged on the operating element, said sensors being at least partially activated during the actuation of the operating element; and
a processor coupled with the plurality of sensors, the processor receiving signals from the plurality of sensors for processing actuation of the operating element, wherein
the processor detects a time sequence of the activation of the sensors during the actuation of the operating element and, based on the time sequence, determines whether an undesired actuation is occurring, the undesired actuation comprising unintended actuations, and/or actuations by a front-seat passenger; and
in an event of the undesired actuation, the processor blocks implementation of one or more actions coupled with the actuation of the operating element in the motor vehicle.

16. The operating element according to claim 15, wherein the operating element is a gear selector lever of a motor vehicle.

17. The operating element according to claim 16, wherein the plurality of sensors comprise one or more proximity sensors.

18. The operating element according to claim 17, wherein at least four sensors are arranged on the gear selector lever.

19. The operating element according to claim 18, wherein:
one or more first sensors are arranged on a driver-side flank of the gear selector lever;
one or more second sensors are arranged on a front-passenger-side flank of the gear selector lever; and
one or more third sensors are arranged on a center flank of the gear selector lever, the center flank extending between the driver-side flank and the front-passenger-side flank on a back side of the gear selector lever facing a forward driving direction of the motor vehicle.

20. A motor vehicle, comprising:
an operating element, the operating element being actuated at least by a driver of the motor vehicle, the operating element comprising:
a plurality of sensors arranged on the operating element, said sensors being at least partially activated during actuation of the operating element; and
a processor coupled with the plurality of sensors, the processor receiving signals from the plurality of sensors for processing the actuation of the operating element, wherein
the processor detects a time sequence of the activation of the sensors during the actuation of the operating element and, based on the time sequence, determines whether an undesired actuation is occurring, the undesired actuation comprising unintended actuations, and/or actuations by a front-seat passenger; and
in an event of the undesired actuation, the processor blocks implementation of one or more actions coupled with the actuation of the operating element in the motor vehicle.

* * * * *